US010929825B2

(12) United States Patent
Ducrohet

(10) Patent No.: US 10,929,825 B2
(45) Date of Patent: Feb. 23, 2021

(54) METHOD FOR TRANSMITTING DATA, CORRESPONDING DEVICES AND COMPUTER PROGRAMS

(71) Applicant: INGENICO GROUP, Paris (FR)

(72) Inventor: Vincent Ducrohet, Saint-Cyr-l'Ecole (FR)

(73) Assignee: INGENICO GROUP, Paris (FR)

( * ) Notice: Subject to any disclaimer, the term of this patent is extended or adjusted under 35 U.S.C. 154(b) by 406 days.

(21) Appl. No.: 15/261,057

(22) Filed: Sep. 9, 2016

(65) Prior Publication Data
US 2017/0076261 A1 Mar. 16, 2017

(30) Foreign Application Priority Data

Sep. 11, 2015 (FR) ...................................... 1558451

(51) Int. Cl.
*G06Q 20/04* (2012.01)
*G06Q 20/20* (2012.01)
*G06Q 20/32* (2012.01)
*G06Q 20/10* (2012.01)
*G06Q 20/42* (2012.01)
*G06Q 20/34* (2012.01)
*H04L 12/58* (2006.01)
*H04L 29/06* (2006.01)

(52) U.S. Cl.
CPC ........... *G06Q 20/108* (2013.01); *G06Q 20/20* (2013.01); *G06Q 20/3255* (2013.01); *G06Q 20/34* (2013.01); *G06Q 20/425* (2013.01); *H04L 51/04* (2013.01); *H04L 67/42* (2013.01)

(58) Field of Classification Search
None
See application file for complete search history.

(56) References Cited

U.S. PATENT DOCUMENTS

| 2002/0107791 | A1 | 8/2002 | Nobrega et al. |
| 2010/0121726 | A1 | 5/2010 | Coulter et al. |
| 2010/0257066 | A1* | 10/2010 | Jones .................... G06Q 20/202 |
| | | | 705/17 |
| 2012/0018506 | A1* | 1/2012 | Hammad ................ G06F 21/34 |
| | | | 235/375 |
| 2012/0203700 | A1 | 8/2012 | Ornce et al. |

FOREIGN PATENT DOCUMENTS

| EP | 1916623 A1 | 4/2008 |
| GB | 2398159 A | 8/2004 |
| WO | 2015100385 A1 | 12/2014 |
| WO | 2015/100385 A1 | 7/2015 |

OTHER PUBLICATIONS

Preliminary search Report from FR1558451, dated Apr. 15, 2016, Breugelmans, Jan.
English abstract of EP 1916623 retrieved from Espacenet on Sep. 6, 2016.
European Search Report with regard to the counterpart EP Patent Application No. 16187144.7 dated Feb. 27, 2018.

* cited by examiner

*Primary Examiner* — Joseph W. King
(74) *Attorney, Agent, or Firm* — BCF LLP

(57) ABSTRACT

The invention relates to a method for transmitting a message, emitted by a server of a merchant, to a communications terminal of a user. According to this method, the message is transmitted to the communications terminal indirectly by using at least one data transmission service specific to a server of a banking institution with which the user possesses a bank account.

6 Claims, 2 Drawing Sheets

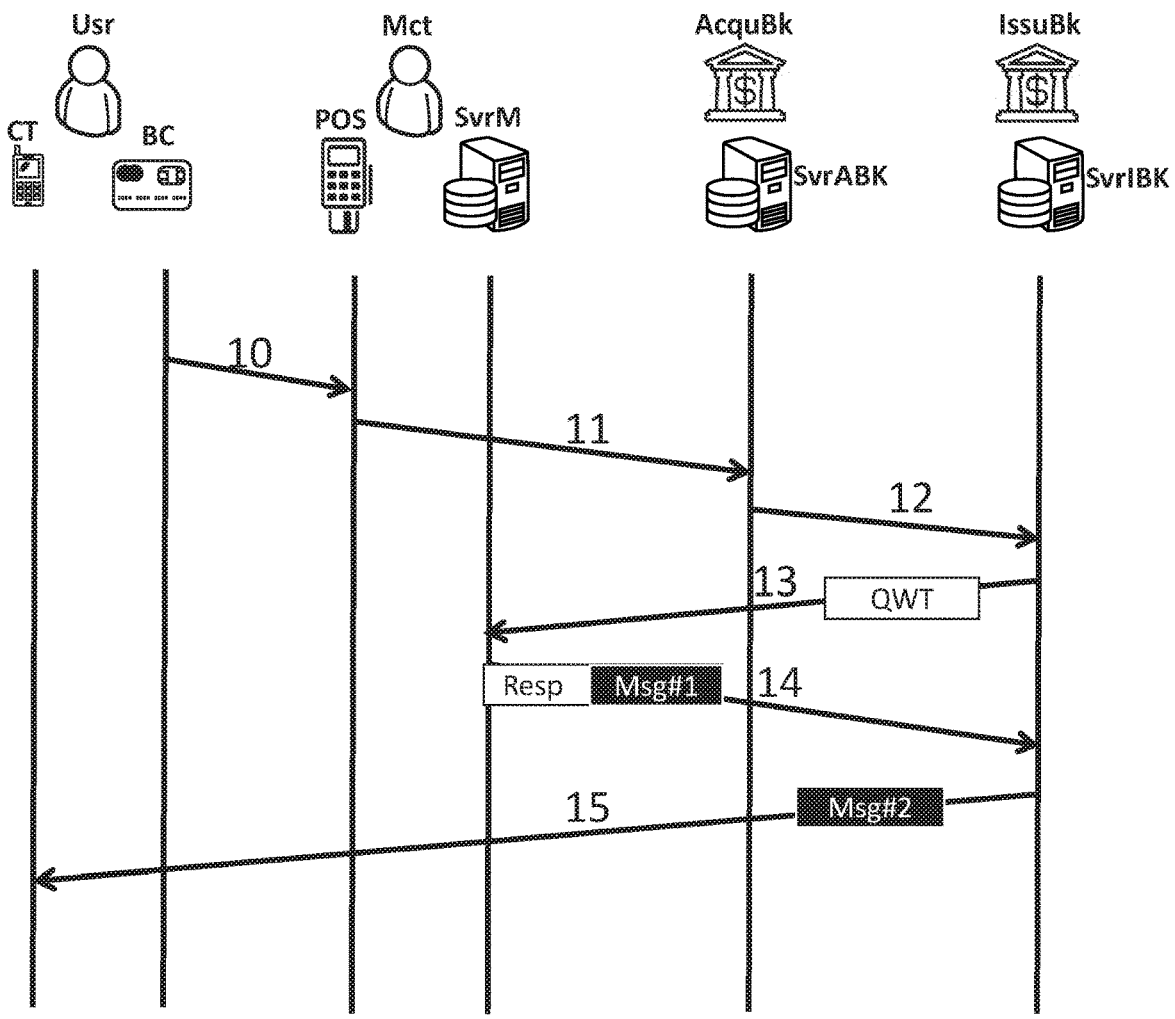
Figure 1
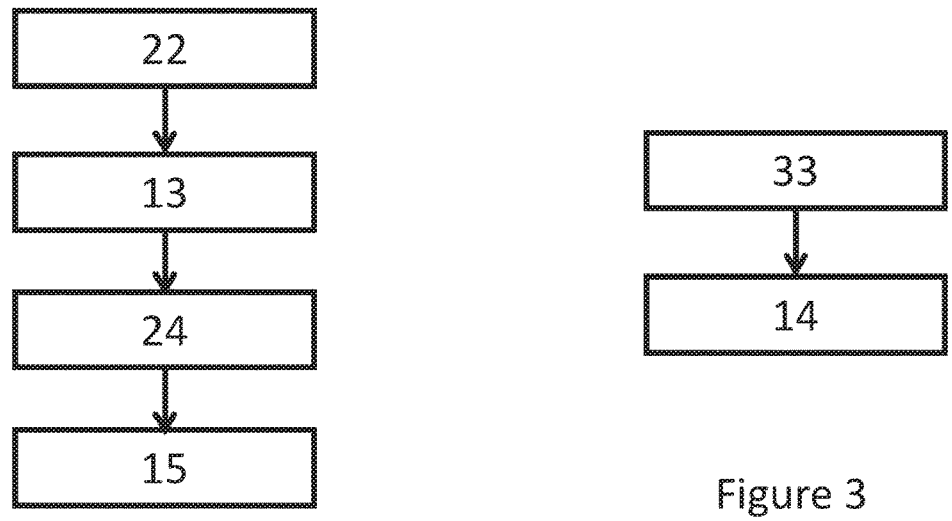
Figure 2
Figure 3

METHOD FOR TRANSMITTING DATA, CORRESPONDING DEVICES AND COMPUTER PROGRAMS

CROSS-REFERENCE

This United States Non-Provisional Patent Application claims priority from French Patent Application Serial No. 1558451, filed on Sep. 11, 2015, the entire content of which is incorporated herein by reference.

FIELD OF THE INVENTION

The proposed technique relates to the transmission of data by merchants to users. The proposed technique relates most specifically to the transmission by a merchant to a user of data representing a piece of information on a purchase made by the user from the merchant.

PRIOR ART

Communications between a merchant and a user are an indispensable element for making a purchase. The merchant must first of all communicate his offer (of a physical or non-physical product and a price). The user signifies acceptance and makes payment, for example, by using his bank card. Then the merchant provides a receipt in the form of a slip or receipt which indicates the amount of the payment and the product or the service purchased. This receipt firstly confirms the actual invoiced amount and warrants the purchase and secondly, enables the merchant to give the user information about the product that has been effectively purchased.

The receipt is a carrier of information in paper form. The merchant needs to be equipped with a printer or a terminal incorporating a printer in order to print out these receipts. The purchase and the maintenance of printers or terminals is an additional expense for merchants. In addition, the massive use of paper raises an ecological problem.

For certain types of sales (for example online sales), the receipts are often in electronic form. After a purchase, the merchant sends the user a receipt or a confirmation of the order by electronic mail (email). To this end, the merchant must either maintain a database of the users' particulars or ask the user to furnish his email address for each purchase. The maintenance of a database of this type (registration, de-registration, modification etc) is complicated and costly for the merchant. Besides, the users have to update their information with the merchants, which can be a source of problems in certain cases. In addition, the users have to identify themselves with the merchant's systems. This leads to additional delays that are inconvenient, especially for fast purchases.

Besides, the modes of selling products and services are changing and making it simpler for users to make purchases. These selling modes have the following common points:
  speed of choice of product and of payment, targeting impulse buying;
  the ability to make transactions at high-peak usage periods;
  sales points reduced to the maximum extent so that they can be deployed speedily and in disparate environments;
  sales points that reduce the total cost of ownership (TCO).

To cover all these sales points, it is possible to integrate payment into a touch screen for example. The ultimate solution will make it possible to make an application on the screen to select the product and make the payment terminal to make contactless payment, by NFC or other electronic payment means. In these cases of use, a receipt (slip) has to be given after each purchase by users. Indeed, for purchases of non-physical products (for example a cinema show), it is necessary to indicate the information that will enable users to access the products (time, hall and place). For purchases of physical products, it is necessary to indicate the means by which users can retrieve the products or give their addresses for dispatching the products.

For reasons of costs, maintenance (paper) and waiting time, the solution using printed receipts is not suited to the massive deployment of sales points. The solution using electronic receipts described here above for online purchases makes it possible to de-materialize or digitize the receipts and avoid the use of printers. However, they require input devices (to identify the users or to enter information) and/or the maintenance of databases containing details about the users. This entails additional time (time spent to identify users or enter information) for purchases and an additional cost in equipment. Besides, should the user have to enter his particulars, there is a risk of disclosure and/or unlawful use by the merchants.

There is therefore a need to provide a solution that enables the communication of information to users after purchases, that resolves the problems of complexity, cost, speed and security.

SUMMARY OF THE INVENTION

The proposed technique does not have at least some of the problems of the prior art. More particularly, the proposed technique relates to a method for transmitting a message, said message coming from a server of a merchant, who wishes to transmit this message to a user having available a communications terminal, said method being characterized in that at least a part of the content of said message is transmitted to said communications terminal indirectly by using at least one data transmission service specific to a server of a banking institution with which said user possesses a bank account.

Thus, the method re-utilizes the existing infrastructure of financial institutions to transmit data coming from a merchant to the users. It is no longer necessary for the merchants to have the users' particulars at their disposal in order to transmit data to them.

According to one particular characteristic, said data transmission service implements said user's telephone number.

According to one particular characteristic, said data transmission service implements an application of the banking institution, said application being installed in a communications terminal of said user.

According to one particular embodiment, said data transmission service is of the "3D-SECURE™" type. Thus, the method can be used for most financial institutions since the 3D-SECURE™ service is extensively used by financial institutions.

According to one particular embodiment, said method comprises the following steps executed after a step for receiving a confirmation of a financial transaction performed between said banking institution of said user and a banking institution of said merchant:
  a step for transmitting a request for obtaining said message to a server of said merchant;
  a step for receiving a response, containing said message, coming from said server of said merchant;

a step for transmitting a second message, comprising at least one part of the content of said message, to said communications terminal of said user.

Thus, the method of transmission is activated by a transaction made by a user. This enables the transmission of a message to a user each time after a transaction is made by the user.

According to one particular characteristic, said confirmation comprises an identifier of said merchant and an identifier of said transaction.

Thus, the banking institution of the user can identify the merchant and the transaction.

According to one particular characteristic, said identifier of said merchant comprises an IP address and a URL address of the server of said merchant.

Thus, the server of the user's banking institution can initialize a communication on the Internet with the merchant's server.

According to one particular embodiment, said message is transmitted to said user in a form suited to the communications device receiving this message.

In another embodiment, the technique also relates to a server of a banking institution for the transmission of a message, said message coming from a merchant, who wishes to transmit this information to a user having a communications terminal at his disposal, said server comprising:
  a module for transmitting a request for said piece of data to a server of said merchant;
  a module for receiving said piece of data from said server of said merchant;
  a module for transmitting said piece of data to said communications terminal of said user.

In another embodiment, the technique also relates to a method for transmitting a message indirectly to a user in using at least one data transmission service specific to a server of a banking institution with which said user possesses a bank account, said method comprising:
  a step for receiving a request for said piece of data from a server of said banking institution of said user;
  a step for transmitting said piece of data to said server of said banking institution of said user.

In another embodiment, the technique also relates to a merchant's server for transmitting a message indirectly to a user in using at least one data transmission service specific to a server of the banking institution with which said user possesses a bank account, said server comprising:
  a module for receiving a request for said piece of data coming from a server of said banking institution of said user;
  a module for transmitting said piece of data to said server of said banking institution of said user.

According to a preferred implementation, the different steps of the methods according to the technique are implemented by one or more software programs or computer programs, comprising software instructions intended for execution by a data processor of a relay module according to the proposed technique and being designed to command the execution of the different steps of the methods.

The proposed technique therefore also proposes a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The proposed technique also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing the hardware resources of this physical entity (memories, recording media, communications buses, input/output electronic boards, user interfaces, etc).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

FIGURES

Other features and advantages shall appear more clearly from the following description of a preferred embodiment, given by way of a simple illustrative and non-exhaustive example and from the appended drawings, of which:

FIG. 1 is a sequence diagram of the method according to the proposed technique;

FIG. 2 illustrates the steps needed for a communications method implemented by the user's bank;

FIG. 3 illustrates the steps needed for a communications method implemented by the merchant;

DESCRIPTION

General Principle

Figure 4:
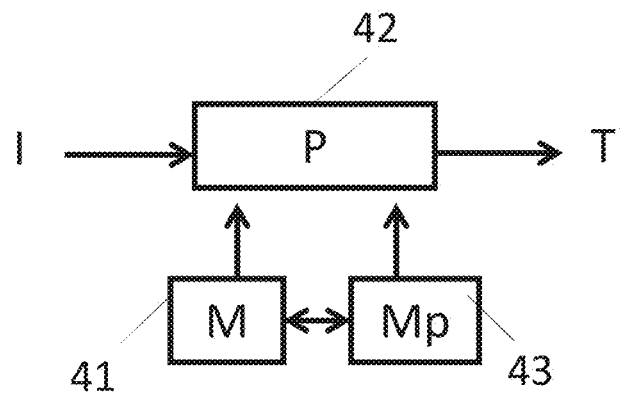
FIG. 4 is a simplified representation of a system of a bank used to implement a method of communication.

In the prior art, it is complicated and costly for merchants to directly transmit messages on purchases made or other information directly to their customer users (here below called users or customers for greater simplicity). This is because it is difficult and complicated to maintain and/or obtain information about users. It is an object of the present invention to enable merchants to transmit information to their customers in a simple, economical and secure manner. The present technique makes it possible for example to resolve the problem of transmitting information to a user when the terminal used to make a purchase (payment terminal) does not have a printer (to provide proof of the reality of the purchase on the one hand and of the amount paid on the other hand). This is for example the case with novel types of terminals which may be called integrated terminals (for example terminals integrated with other objects such as screens that are or are not touch screens). A terminal is then for example, integrated within a display panel which can be provided with a digital display screen (LCD) on which one or more messages are displayed. These messages can, for example, request individuals to make a donation to a charity association or foundation or purchase an item or a service etc. An independent terminal can also be a dispenser of beverages, food items, etc.

In this type of terminal, the payment means implemented is generally a contactless means: it can be a contactless payment card or a communications terminal provided with a contactless interface. To make a donation or a purchase, the user must simply present his contactless payment means before the integrated terminal. The integrated terminal reads the data without contact (the bank card data for example) and transmits this data to a transaction server which manages the debit from the user's account with the bank that has issued the bank card. One problem is that the user is not immediately informed of the amount of the transaction. The present technique resolves this problem. Another problem, also resolved by the present technique, is that the operator of the integrated payment terminal (i.e. the merchant) cannot inform the user (for example to thank him for a donation). To resolve this problem and other more general problems concerning communications between a customer user and a merchant, the present technique uses an existing architecture (that of the bank network) to set up this communication between the user and the merchant and to do so without requiring the entry of data by the user.

The general principle of the technique proposed therefore consists in making profitable use of existing systems of banking institutions in the prior art. Indeed, banking institutions maintain databases for their own requirements, comprising their clients' particulars, in order to communicate with them if necessary. For example, the 3D-SECURE™ online payment technique requires that the banking institution should know its customer's telephone number in order to be able to send this customer a "challenge" designed to prove the identity of the user trying to make a bank card payment (the challenge would be a code to be entered in a determined field of a web page). Thus, the proposed technique consists in transmitting data representing information coming from the merchants (security messages, commercial messages, information messages) indirectly to the users in using a data transmission service specific to a server of a banking institution with which said user possesses a bank account.

The main steps of the technique are illustrated with reference to FIG. 1. The participants in the method illustrated in FIG. 1 are: a user Usr provided with a communications terminal CT and a bank card BC; a merchant Mct provided with a payment terminal POS and a server SvrM; an acquiring bank IssuBK which is a banking institution with which the merchant has a bank account; and an issuing bank AcquBK which is a banking institution with which the user has a bank account. When the user Usr makes a purchase with a merchant Mct he makes payment 10 by using for example a bank card BC on the payment terminal POS of the merchant Mct. The payment terminal POS of the merchant Mct transmits 11 a transaction request to a transaction server SvrABK of the merchant's banking institution (acquiring bank AcqBK). The transaction request comprises especially information representing the user's bank account and/or bank card (and therefore the issuing bank IssuBK) and the amount to be paid for the product purchased by the user. The server SvrABK of the merchant's banking institution (acquiring bank AcqBK) validates this transaction (either by requesting authorization from the banking server SvrIBK of the user's bank IssuBK or independently) and transmits 12, a confirmation of the transaction to this server of the banking institution SvrIBK of the issuing bank IssuBK. The confirmation of the transaction can include especially an identifier of the merchant and an identifier (or a number) of the transaction. The identifier of the merchant can include an IP address or a URL address (or URI address) of the server SvrM of the merchant Mct. This identifier of the merchant makes it possible, according to the present technique for the users' banks (issuing bank IssuBK) to initiate communications with the merchant Mct.

The servers SvrABK and SvrIBK of the proposed technique can therefore be novel servers dedicated to the implementation of the proposed technique. Preferably, they can also take the form of specific modules of the transaction processing server. Thus, it is not necessary to modify the existing technical architecture.

After having received confirmation of the transaction, a server SvrIBK of the user's bank (issuing bank IssuBK) transmits a request (QWT) to the server SvrM of the merchant Mct for obtaining a message (Msg#1) to be transmitted to the user.

In response to the request QWT, the server SvrM of the merchant Mct transmits 14 a response (Resp) to the server SvrIBK of the user's banking institution (issuing bank IssuBK). This response (Resp) comprises a message to be transmitted to the user. The request transmitted by the server SvrIBK of the user's banking institution (issuing bank IssuBK) can include the identifier of the transaction preliminarily made and/or an identifier of the user (for example a hash of the bank card number). The server of the merchant Mct can identify the user's corresponding purchase from the identifier of the transaction or the hash of the user's bank card number or again a token. It can then generate the message containing the information that it wishes to transmit (this message is not necessarily related to the purchase) and place the message (Msg#1) in the response (Resp) to the request (QWT). The information to be transmitted corresponds for example to the total amount of the purchase made by the user, or to other aspects.

For example, the server SvrM of the merchant Mct can communicate with the payment terminal POS and/or have a database comprising information on all the purchases from the merchant Mct and information on the corresponding bank transactions. The information generated by the server SvrM of the merchant Mct, intended for the user Usr, can be a message providing information on a purchase, a proof of purchase and/or an advertising message, a security message (for example related to the user's account). This last possibility is particularly interesting; the broadcasting of a security message by this architecture is efficient and reliable because the banking infrastructure for distributing messages is itself secured. Thus the present technique increases the general security level of transmission of messages between a merchant and a user. The message to be transmitted to the user can take the form of an image, a text, 1D code or 2D code or a URL comprising such information.

After having received the message Msg, the server extracts the content (for example if it is a text) of this message. From this content (at least a part of this content), the server SvrIBK of the user's banking institution (issuing bank IssuBK) creates its own message (second message) Msg#2 and transmits it 15 to the user. The second message Msg#2 is transmitted for example by SMS or MMS (to a communications termination CT of the user Usr) or again by means of a mobile application notification. The second message Msg#2 can also be transmitted by email or by using an application (application of the bank installed on the user's communications terminal) or another communications application. The user Usr can thus be informed of the information on the donation made, or the product or the service purchased. In the case of use of a banking application, the sequence for securing the transmission of the message is kept; indeed, the transmission of notification by the banking application uses a secured message transmission channel that is difficult to penetrate and defraud. This means that the information transmitted by the merchant (and received by the user) has great reliability.

Thus, without the bank having any need to disclose confidential information about its client (i.e. telephone number, electronic mail address etc), the merchant can come into contact with it and send it data that he cannot usually transmit (because he does not have information on the user) or that he does not wish to transmit by using a complex and costly architecture for the management of customer data.

Server of the User's Banking Institution (Issuing Bank)

The banking institution IssuBK of the user Usr has a server SvrIBK which makes it possible to implement the method for transmitting a message to a communications terminal CT of the user Usr. The method implemented by the server SvrIBK of the banking institution IssuBK of the user Usr comprising the following steps:

- a step 22 for receiving a confirmation of a financial transaction; this financial transaction is made between a processing server of a banking institution transaction IssuBK of the user and a transaction server of a banking institution AcqBK of the merchant. This confirmation can comprise an identifier of the merchant Mct comprising an IP address and a URL address of a server SvrM of the merchant Mct, and enabling a server SvrIBK of the user's banking institution IssuBK to initialize a communication call with the server SvrM of the merchant Mct. The confirmation can also include an identifier (or number) of the transaction. Indeed, the merchant Mct also has this transaction identifier in his server SvrM for checks and financial or legal controls if any;
- a step 13 for transmitting a request, to the server SvrM of the merchant Mct, for obtaining a message; the content of this message is to be transmitted to a communications terminal CT of the user; the request can include the identifier of the transaction; indeed, the merchant Mct has available a database which comprises information on the purchases and the corresponding bank transactions. The identifier of the transaction thus makes it possible, according to the present technique, for the merchant Mct to identify the purchase or purchases corresponding to the transaction and to generate a message corresponding to the purchase or purchases made by the user;
- a step 24 for receiving the message generated by the merchant from the server SvrM of the merchant Mc; the message in question is not necessarily related to the purchase; it can relate to the purchase but it can also relate to other messages (for example a security message concerning the user's account with the merchant). This type of message transmission is advantageous because it provides the benefit of a secured transmission channel, namely that of the banking institution;
- a step 15 for transmitting the content of the previously received message to the user's communications terminal CT; the content of the first message is inserted into a second message which is transmitted to the user by means of the bank's channel. The second message is transmitted on behalf of the merchant Mct.

Thus, the transmission of data representing information on purchases by users is carried out by a transmission service of the users' banking institutions. It is thus not necessary for the users to enter their details or to identify themselves when making purchases with the merchants (and this simplifies the purchase made through an integrated terminal). In addition, the users' particulars are kept by the banks and are not accessible to the merchants. The security of the users' particulars is thus guaranteed. This prevents inappropriate use of these particulars by merchants (for example, for advertising campaigns).

FIG. 4 illustrates a hardware architecture of the server SvrIBK of the user's banking institution Usr. This hardware architecture comprises a memory 41 constituted by a buffer memory, a processing unit 42, equipped for example with a microprocessor, and driven by the computer program 43 implementing the necessary steps of the method of communication as described here above. At initialization, the code instructions of the computer program 43 are, for example, loaded into a memory and then executed by the processor of the processing unit 42. The microprocessor of the processing unit 42 implements the steps of the method of transmission described here above, according to the instructions of the computer program 42. To this end, the server of the banking institution SvrIBK of the user Usr comprises:

- a module for the transmission, to a server SvrM of a merchant Mct, of a request for obtaining a message to be transmitted. This message is to be transmitted to a communications terminal CT of a user Usr from the merchant Mct;
- a module for receiving messages coming from the server SvrM of the merchant Mct; this can be a general module for receiving messages;
- a module for transmitting a message comprising said piece of data to the communications terminal CT of the user Usr; it can be a general module for transmitting messages.

These modules can be driven by the processor of the processing unit 42 according to the computer program 43. These modules take the form of software programs or hardware specifically or not specifically dedicated to implementing the present technique.

Preferably, the second message is transmitted to a mobile telephone of the user in the form of an SMS or MMS type message, in using the existing data needed to implement the "3D-SECURE™" securing technology. Indeed, the existing infrastructure (the servers) of 3D-SECURE™ technology already implemented by banks enables SMS messages to be sent to their customers. The 3D-SECURE™ technology is called "Verified by Visa™" by VISA™ and it is called "SecureCode™" by MASTERCARD™. This is a bank protocol which will be used by the merchant during the electronic payment. The purpose of this protocol is to carry out a strong authentication of the individual making the transaction in order to make sure that this individual is truly the owner of the card being used.

To carry out the strong authentication, the method most commonly used is the following:
- the user enters payment data on a merchant's internet page;
- the merchant initiates a 3D-SECURE™ transaction through his acquiring equipment;
- the issuing bank sends a dynamic password (OTP or "one-time password)" to the user on his mobile telephone through an SMS;
- the merchant asks the user for the OTP to validate the transaction (validation of the transaction if the OTP entered corresponds to the one that has been sent).

This process for securing internet payment is deployed and used in many countries. The issuing banks therefore possess the mobile telephone number of each of their customers and have the tools needed to maintain this database according to changes in the telephone number of the users.

Thus, the proposed technique can re-utilize the 3D-SECURE™ servers deployed by banks to send SMS messages to the user's mobile telephone. The cost of implementing the proposed technique is therefore greatly limited.

The Merchant's Server

The merchant Mct has a server SvrM used to implement a method for transmitting messages indirectly to a user Usr by using at least one data transmission service specific to a server SvrIBK of the banking institution IssuBK with which said user has a bank account.

The method implemented by the merchant server SvrM comprises:
- a step 33 for receiving, from the server SvrIBK of the banking institution IssuBK of the user Usr, a request for obtaining a message to be transmitted to the user Usr; the message can include an identifier of a financial transaction performed by the user Usr; the identifier of the transaction enables the merchant Mct to identify the purchase corresponding to the transaction and to generate a message corresponding to the purchase made by the user Usr; +
- depending on embodiments, the request for obtaining messages can have two origins:
- either this request comes directly from the server SvrIBK of the banking institution IssuBK of the user Usr, i.e. the server SvrIBK has directly transmitted this request to the merchant's SvrM;
- or this request comes from the server SvrABK, belonging to the merchant's bank; the request is then relayed by the server SvrABK and comes in directly from the server SvrIBK; there can be several reasons for this relay by the server of the merchant's bank; for example, the merchant's bank does not wish the user's bank to interact directly with the merchant (for reasons of customer databases) or again because the user's bank does not wish to implement communications infrastructure with the servers of the merchants;

Thus, depending on the embodiments, the step for receiving the request for obtaining 33 can be preceded by a step for transmitting an initial request towards the server of the merchant's banking institution:
- a step 14 for transmitting the message to the server SvrIBK of the banking institution IssuBK of the user Usr, this message being integrated into a response; the address of the server SvrIBK of the banking institution IssuBK of the user Usr can be an IP address or a URL address; the IP address can be obtained by the merchant Mct when reading the header (in the source address fields) of the IP frame; the user URL can be included in the request transmitted by the server SvrIBK of the banking institution IssuBK of the user Usr;
- in the same way, depending on the embodiments, the response can be relayed by means of the server SvrABK of the merchant's banking institution.

Figure 5:
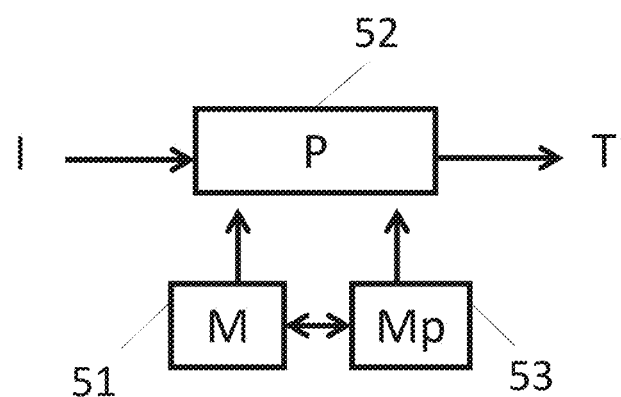
FIG. 5 is a simplified view of a merchant's server enabling a method of communication to be implemented.

FIG. 5 illustrates a hardware architecture of the server SvrM of the merchant Mct. This hardware architecture comprises a memory 51 constituted by a buffer memory, a processing unit 52, equipped for example with a microprocessor and driven by the computer program 53 implementing the steps needed for the communications method as described here above. At initialization, the code instructions of the computer program 53 are for example, loaded into a memory and then executed by the processor of the processing unit 52. The microprocessor of the processing unit 52 implements the steps of the method of transmission according to the instructions of the computer program 52. To this end, the server SvrM of the merchant Mct comprises:
- a module for receiving a request, (directly or indirectly) from a server SvrIBK of the banking institution IssuBK of a user Usr, for obtaining a message to be transmitted to the user Usr;
- a module for transmitting data to the server SvrIBK of the banking institution IssuBK of the user.

These modules can be driven by the processor of the processing unit 52 according to the computer program 53. These modules take the form of software or hardware, dedicated specifically or not specifically to implementing the present technique.

Description of a Case of Use

Here below, we describe one embodiment of the proposed method during a purchase of a cinema ticket at a self-service kiosk for sales or making donations. This self-service kiosk (for sales or making donations to an association for example) comprises an integrated payment terminal.

In this example, it is assumed that the self-service kiosk is used to sell cinema seats. The self-service kiosk has a touch screen and a payment terminal POS provided with the NFC function. The touch screen displays the available film shows and the corresponding prices. The user can choose a show and a seat on the touch screen of the terminal. To make payment, the user can simply pass a payment card or a mobile telephone provided with the NFC function in front of a detection zone of the payment terminal POS. A request for transaction to the benefit of the merchant is thereafter transmitted to a transaction server of the merchant's bank (acquiring bank AcqBK). The transaction server of the bank AcqBK of the merchant Mct validates the transaction and sends a confirmation of the transaction to a server of the user's bank (the issuing bank IssuBK). This confirmation can include a transaction number for the transaction made and a URL address of the merchant's server SvrM. Naturally, the debited account in the transaction is the user's account with the issuing bank IssuBK. The server SvrIBK of the user's bank (issuing bank) can access a database comprising its customers' particulars. The server SvrIBK of the user's bank Usr can launch a search in the database and obtain the user's mobile telephone number from the account number of the user Usr.

After having received confirmation of the transaction, the server SvrIBK of the user's bank Usr can send a request to the URL address of the server SvrM of the merchant Mct to ask the merchant Mct to provide the content of a message to be sent to the user Usr. The request can include the number of the transaction that has just been confirmed. Upon reception of this request, the server SvrM of the merchant Mct identifies the purchase that corresponds to the transaction number provided in the request and generates a message indicating the number of the cinema ticket, the amount invoiced, the address of the cinema (if necessary), the show and/or the number of the hall and/or the seat. The message can include a link, of a hypertext type, to obtain detailed information (summary and photographs of the film, 2D code of the ticket to facilitate checks etc) on the cinema ticket. This message is thereafter transmitted to the server SvrIBK of the bank IssuBK of the user Usr.

Upon reception of the message, the server SvrIBK of the bank IssuBK of the user Usr can directly transmit the message to the user's mobile telephone by SMS, MMS or any other suitable means of message transmission (for example a mobile application notification). The bank IssuBK can also verify the exactness of the amount invoiced in the message before transmitting it to the user Usr. If the amount invoiced in the message does not correspond to the confirmed amount of the transaction, then the server SvrIBK of the user's bank IssuBK can alert the user by SMS. This enables the bank and the user to detect any fraud on the part of the merchants.

The invention claimed is:

1. A method for sending a financial transaction message from a merchant to a mobile device of a customer, the method comprising:
   receiving, by a server of a banking establishment corresponding to a payment account of the customer, a confirmation of a financial transaction made between the banking establishment corresponding to the payment account of the customer and a banking establishment corresponding to the merchant, regarding a financial transaction made between the customer and the merchant, wherein the confirmation comprises an internet protocol (IP) address or a uniform resource locator (URL) address of a server of the merchant; and
   in response to receiving the confirmation:
      transmitting, by the server of the banking establishment corresponding to the payment account of the customer, using the IP address or the URL address, and to the server of the merchant, a request for a message corresponding to the financial transaction,
      receiving, by the server of the banking establishment corresponding to the payment account of the customer, from the server of the merchant, and after transmitting the request, a response containing the message, and
      determining, by the server of the banking establishment corresponding to the payment account of the customer, based on the received confirmation of the financial transaction, an identifier of the mobile device of the customer; and
   transmitting, by the server of the banking establishment corresponding to the payment account of the customer, using the determined identifier, and to the mobile device of the customer, at least a portion of the message.

2. The method of claim 1, wherein transmitting the at least the portion of the message to the mobile device of the customer comprises transmitting, via a data transmission service, the at least the portion of the message, and wherein the data transmission service implements a telephone number of the customer.

3. The method of claim 1, wherein transmitting the at least the portion of the message to the mobile device of the customer comprises transmitting, via a data transmission service, the at least the portion of the message, wherein the data transmission service implements an application of the banking establishment corresponding to the payment account of the customer, and wherein the application is installed in the mobile device of the customer.

4. The method of claim 1, wherein the received confirmation comprises an identifier of the financial transaction.

5. The method of claim 1, wherein the at least the portion of the message is transmitted to the mobile device of the customer in a form adapted to the mobile device of the customer.

6. A system comprising:
   at least one processor, and
   memory storing a plurality of executable instructions which, when executed by the at least one processor, cause the system to:
      receive a confirmation of a financial transaction made between a banking establishment corresponding to a payment account of a customer and a banking establishment corresponding to a merchant, wherein the confirmation comprises an internet protocol (IP) address or a uniform resource locator (URL) address of a server of the merchant; and
      in response to receiving the confirmation:
         transmit, using the IP address or the URL address, to the server of the merchant, a request for a message corresponding to the financial transaction,
         receive, from the server of the merchant, and after transmitting the request, a response containing the message,
         determine, based on the received confirmation of the financial transaction, an identifier of a mobile device of the customer; and
         transmit, using the determined identifier, to the mobile device of the customer, at least a portion of the message.

* * * * *